(12) United States Patent
Rogalla et al.

(10) Patent No.: US 10,176,086 B2
(45) Date of Patent: Jan. 8, 2019

(54) EVENT-DRIVEN SOFTWARE TEST SEQUENCE DETERMINATION

(71) Applicant: FUJITSU LIMITED, Kawasaki-shi, Kanagawa (JP)

(72) Inventors: Martin J. Rogalla, Sunnyvale, CA (US); Mukul R. Prasad, San Jose, CA (US)

(73) Assignee: FUJITSU LIMITED, Kawasaki (JP)

(*) Notice: Subject to any disclaimer, the term of this patent is extended or adjusted under 35 U.S.C. 154(b) by 177 days.

(21) Appl. No.: 15/284,068

(22) Filed: Oct. 3, 2016

(65) Prior Publication Data
US 2018/0095865 A1    Apr. 5, 2018

(51) Int. Cl.
G06F 11/00    (2006.01)
G06F 11/36    (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3692
See application file for complete search history.

(56) References Cited

U.S. PATENT DOCUMENTS

| | | | | |
|---|---|---|---|---|
| 7,779,302 B2* | 8/2010 | Fung | ................. | G06F 11/3672 714/38.1 |
| 8,683,494 B1* | 3/2014 | Prasad | ................. | G06F 9/542 719/318 |
| 8,966,453 B1* | 2/2015 | Zamfir | ................. | G06F 11/3604 714/38.1 |
| 9,619,375 B2* | 4/2017 | Avgerinos | ........... | G06F 11/3688 |
| 9,639,454 B2* | 5/2017 | Fujiwara | ............. | G06F 11/3684 |
| 9,715,440 B2* | 7/2017 | Crawford | ............ | G06F 11/3676 |
| 9,811,448 B2* | 11/2017 | Li | ........................ | G06F 11/3684 |
| 9,983,977 B2* | 5/2018 | Chavez | .................... | G06F 8/20 |

(Continued)

OTHER PUBLICATIONS

"A Framework for Automated Testing of JavaScript Web Applications" Artemis (Artzi et al., ICSE2011), May 2011.

(Continued)

*Primary Examiner* — Joshua P Lottich
(74) *Attorney, Agent, or Firm* — Maschoff Brennan (57) ABSTRACT

According to an aspect of an embodiment of the present disclosure, a method may include selecting, based on a behavioral model of an event-driven software program, an execution target of the event-driven software program. The execution target may be selected from multiple execution targets of the event-driven software program and may include an event of the event-driven software program. Additionally, the behavioral model may be generated using passive learning that is based on behavior of the event-driven software program during symbolic execution of the event-driven software program. The method may further include symbolically executing the execution target based on the selection. The event-driven software program may transition from a first state to a second state in response to execution of the execution target. In addition, the method may include updating the behavioral model of the event-driven software program based on symbolically executing the execution target.

20 Claims, 4 Drawing Sheets

(56) References Cited

U.S. PATENT DOCUMENTS

| | | | | |
|---|---|---|---|---|
| 2003/0110474 A1* | 6/2003 | Ur | ................. | G06F 11/3608 717/131 |
| 2012/0317647 A1* | 12/2012 | Brumley | ................. | G06F 21/00 726/25 |
| 2014/0019939 A1* | 1/2014 | Wiggers | ................. | G06F 8/30 717/124 |
| 2014/0082594 A1* | 3/2014 | Li | ................. | G06F 8/436 717/126 |
| 2015/0309920 A1* | 10/2015 | Ishigooka | ................. | G06F 11/3688 717/126 |
| 2015/0331787 A1* | 11/2015 | Wiggers | ................. | G06F 11/3684 717/124 |
| 2015/0339217 A1* | 11/2015 | Avgerinos | ................. | G06F 11/3688 717/132 |
| 2015/0363305 A1* | 12/2015 | Guan | ................. | G06F 11/3688 717/132 |
| 2015/0370541 A1* | 12/2015 | Prasad | ................. | G06F 8/38 717/104 |
| 2016/0259943 A1* | 9/2016 | Murthy | ................. | G06F 21/577 |
| 2016/0292064 A1* | 10/2016 | Yoshida | ................. | G06F 11/3612 |
| 2017/0177465 A1* | 6/2017 | Li | ................. | G06F 11/3684 |
| 2018/0181485 A1* | 6/2018 | Simbara | ................. | G06F 9/44 |

OTHER PUBLICATIONS

"Invariant-Based Automatic Testing of AJAX User Interfaces" Crawljax (Mesbah & van Deursen, ICSE09), 2009.

"Guided GUI Testing of Android Apps with Minimal Restart and Approximate Learning" SwiftHand (Choi et al., OOPSLA 2014), Oct. 2013.

"MACE: Model-inference-Assisted Concolic Exploration for Protocol and Vulnerability Discovery" Mace Cho et al., USENIX Security, 2011.

"Symbolic Learning of Component Interfaces" PSYCO (Giannakopoulou et al., SAS2012), 2012.

"SymJS: Automatic Symbolic Testing of JavaScript Web Applications" SymJS, Li et al, FSE 2014, 2014.

\* cited by examiner

EVENT-DRIVEN SOFTWARE TEST SEQUENCE DETERMINATION

FIELD

The embodiments discussed in the present disclosure are related to determining event-driven software test sequences.

BACKGROUND

Testing software, such as validating or verifying software, is a common activity among information technology (IT) organizations. For example, whether the software is a desktop application for execution at one or more client computer systems, mobile device application for execution on a mobile device, or a web application for execution at one or more server computer systems, it is often important to verify the quality of the software. While some types of errors in software cause only annoyance or inconvenience to users, other types of errors have the potential to cause other problems, such as data and financial loss.

One type of software that is becoming more ubiquitous is event-driven software such as graphical user interface (GUI) based applications and web based applications. In event-driven software, the flow of the software may be determined by events such as user actions (mouse clicks, key presses), sensor outputs, or messages from other programs/threads. Using event-driven software may ease use of mobile devices and other devices for users. However, event-driven software also provides challenges in analyzing the behavior of these programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment of the present disclosure, a method may include selecting, based on a behavioral model of an event-driven software program, an execution target of the event-driven software program. The execution target may be selected from multiple execution targets of the event-driven software program and may include an event of the event-driven software program. Additionally, the behavioral model may be generated using passive learning that is based on behavior of the event-driven software program during symbolic execution of the event-driven software program. The method may further include symbolically executing the execution target based on the selection. The event-driven software program may transition from a first state to a second state in response to execution of the execution target. In addition, the method may include updating the behavioral model of the event-driven software program based on symbolically executing the execution target.

The object and advantages of the embodiments will be realized and achieved at least by the elements, features, and combinations particularly pointed out in the claims.

It is to be understood that both the foregoing general description and the following detailed description are explanatory and given as examples and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of testing event-driven software programs, such as graphical user interface (GUI) based applications for electronic devices and web based applications. The flow of event-driven software programs may be determined by different "events" such as user actions (mouse clicks, key presses), sensor outputs, or messages from other programs/threads. Event-driven software programs may have a large number of different events and corresponding event sequences that may be explored with respect to the generation of test sequences (e.g., event sequences that may be used to test event-driven software programs), which may lead to an event sequence explosion problem when analyzing the event-driven software programs to generate test sequences.

As detailed below, behavioral models may be used to help direct exploration of event-driven software programs, which may help reduce the event sequence explosion problem. In particular, a behavioral model may be generated based on behavior of an event-driven software program that occurs during symbolic execution of the event-driven software program. Additionally, the behavioral model may be used to prioritize the symbolic execution of events of the event-driven software program. The prioritization may help reduce the number of redundant paths that may be explored while also increasing coverage of the event-driven software program during exploration. In some embodiments, event-execution sequences that may be explored may be used as test event-execution sequences that may be used to test the event-driven software program.

Embodiments of the present disclosure are explained with reference to the accompanying drawings.

Figure 1A:
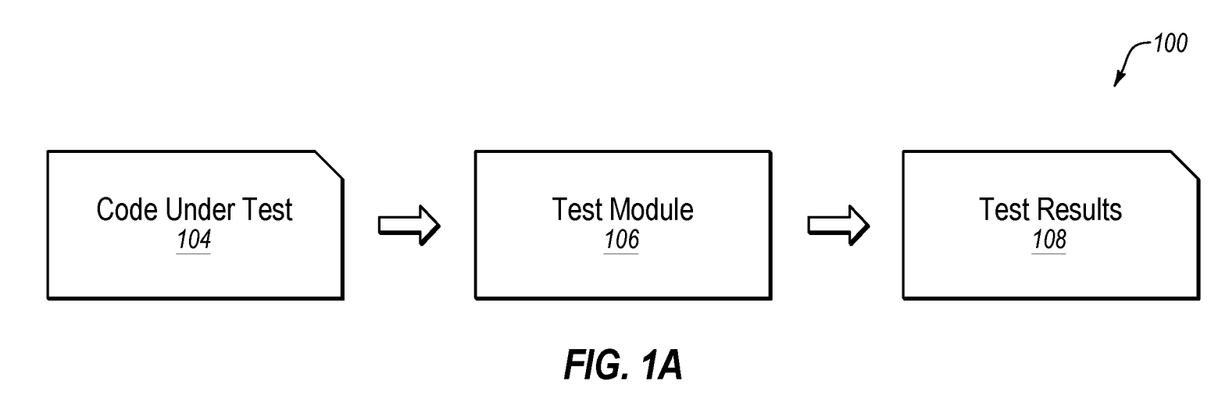
FIG. 1A is a diagram representing an example system configured to perform operations with respect to testing software.

FIG. 1A is a diagram representing an example system 100 configured to perform operations with respect to testing software, arranged in accordance with at least one embodiment described in the present disclosure. In particular, the system 100 may include a test module 106 configured to perform testing operations with respect to code under test 104 of an event-driven software program to generate test results 108 of the event-driven software program. The code under test 104 may include electronic data, such as, for example, the event-driven software program, code of the event-driven software program, libraries, applications, scripts, or other logic or instructions for execution by a processing device. In some embodiments, the code under test 104 may include a complete instance of the event-driven software program. In these or other embodiments, the code under test 104 may include a portion of the event-driven software program. The code under test 104 may be written in any suitable type of computer language that may be used for event-driven software programs.

The code under test 104 may include portions of the event-driven software program organized into a number of software modules. The software modules may include code that performs specific functionalities of the software modules. Code that performs specific functionalities may be referred to as software functions. In some embodiments, the code under test 104 may execute one or more software functions in response to an occurrence of an event associated with the event-driven software program. For example, the code under test 104 may include a software function "f1(*a*)" that may perform operations with respect to a variable "a" in response to an event "e1." In the present disclosure, software functions that perform operations in response to an occurrence of an event may be referred to as "event-handlers." In the following description, the "execution of an event" is considered synonymous with the execution of its corresponding event-handler, and these two expressions may be used inter-changeably. Further, the execution of an event-handler, may involve the event-handler transitively invoking and executing one or more other functions during its execution. Thus, in some embodiments, reference to the execution of a particular event-handler may include execution of functions invoked or executed by the particular event-handler.

As detailed below, the test module 106 may be configured to perform a series of operations with respect to the code under test 104 to generate the test results 108. For example, the test module 106 may be configured to perform symbolic execution with respect to the code under test 104 to explore the code under test 104. The performance of the symbolic execution may include symbolically executing events of the code under test 104. In some embodiments, the test module 106 may be configured to generate and update a behavioral model of the code under test 104 during the symbolic execution. Additionally, the test module 106 may be configured to prioritize the execution of events during the symbolic execution based on the behavioral model. In these or other embodiments, the test module 106 may be configured to output, as the test results 108, one or more event sequences that may be explored during the symbolic execution. In some embodiments, the test module 106 may be configured to perform, with respect to the code under test 104, one or more operations described below with respect to a method 200 of FIG. 2 (described in detail below) to generate the test results 108.

Figure 1B:
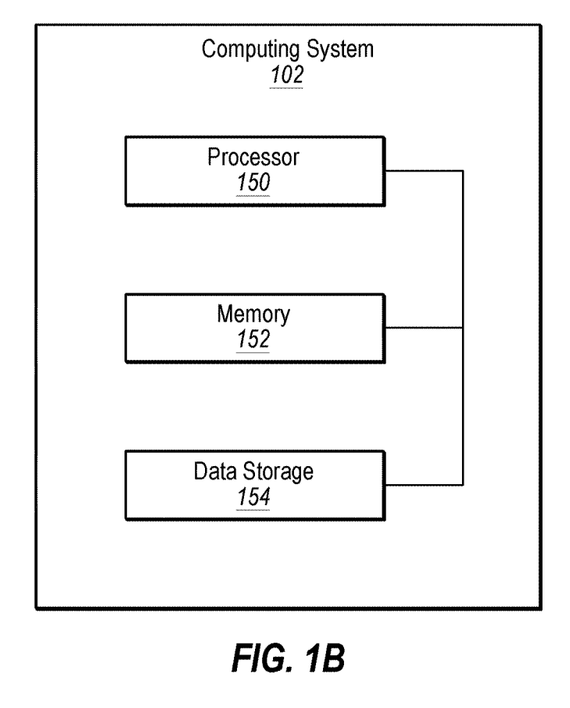
FIG. 1B illustrates an example electronic device that may include a test module described in FIG. 1A.

FIG. 1B illustrates a block diagram of an example computing system 102, according to at least one embodiment of the present disclosure. The computing system 102 may be configured to implement or direct one or more operations associated with a test module (e.g., the test module 106 of FIG. 1A). The computing system 102 may include a processor 150, a memory 152, and a data storage 154. The processor 150, the memory 152, and the data storage 154 may be communicatively coupled.

In general, the processor 150 may include any suitable special-purpose or general-purpose computer, computing entity, or processing device including various computer hardware or software modules and may be configured to execute instructions stored on any applicable computer-readable storage media. For example, the processor 150 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, the processor 150 may include any number of processors configured to, individually or collectively, perform or direct performance of any number of operations described in the present disclosure. Additionally, one or more of the processors may be present on one or more different electronic devices, such as different servers.

In some embodiments, the processor 150 may be configured to interpret and/or execute program instructions and/or process data stored in the memory 152, the data storage 154, or the memory 152 and the data storage 154. In some embodiments, the processor 150 may fetch program instructions from the data storage 154 and load the program instructions in the memory 152. After the program instructions are loaded into memory 152, the processor 150 may execute the program instructions.

For example, in some embodiments, the test module may be included in the data storage 154 as program instructions. The processor 150 may fetch the program instructions of the test module from the data storage 154 and may load the program instructions of the test module in the memory 152. After the program instructions of the test module are loaded into memory 152, the processor 150 may execute the program instructions such that the computing system may implement the operations associated with the test module as directed by the instructions.

The memory 152 and the data storage 154 may include computer-readable storage media for carrying or having computer-executable instructions or data structures stored thereon. Such computer-readable storage media may include any available media that may be accessed by a general-purpose or special-purpose computer, such as the processor 150. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as used herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 102 without departing from the scope of the present disclosure. For example, in some embodiments, the computing system 102 may include any number of other components that may not be explicitly illustrated or described.

Figure 2:
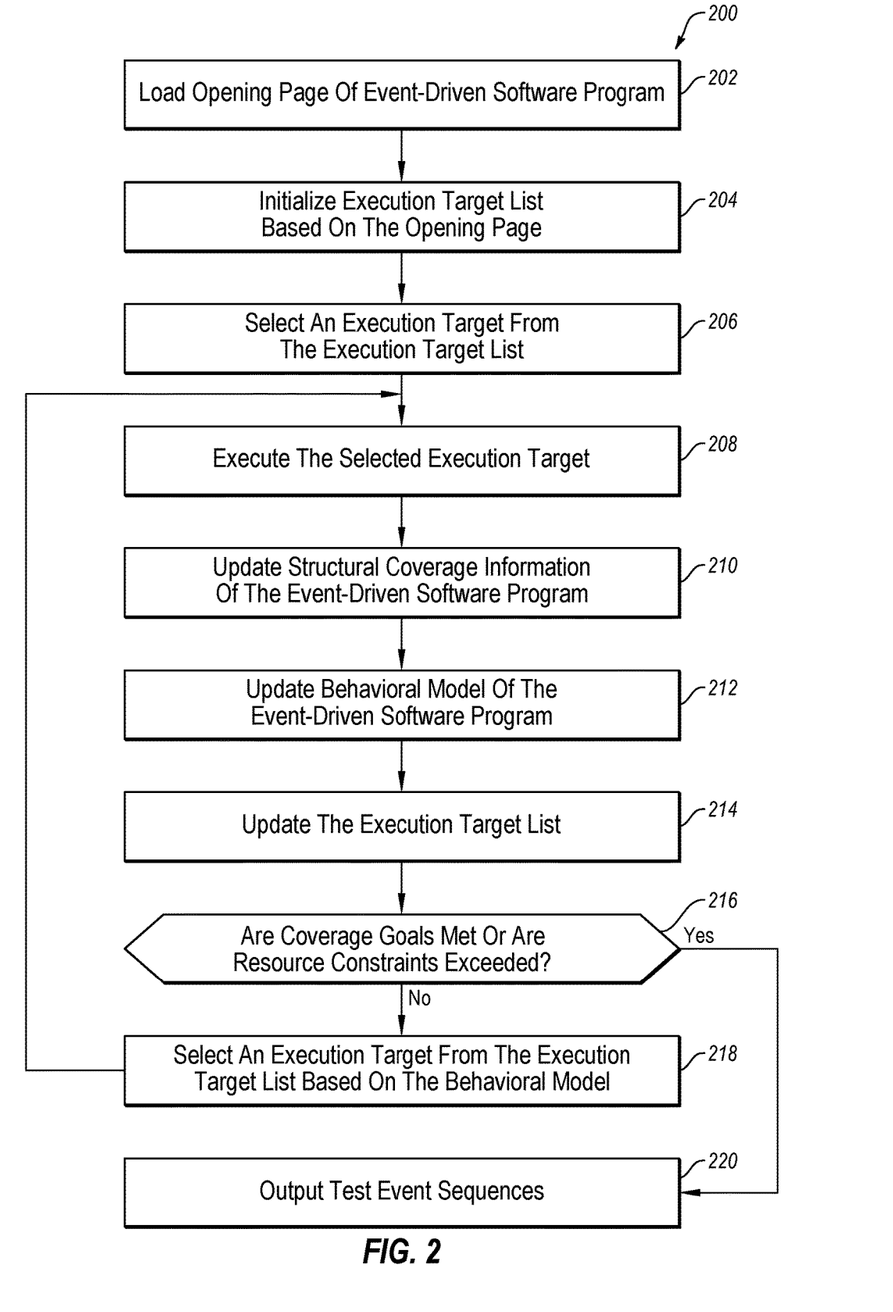
FIG. 2 is a diagram of an example method that may be used with respect to testing event-driven software programs.

FIG. 2 is a diagram of an example method 200 that may be used with respect to testing event-driven software programs, according to at least one embodiment described in the present disclosure. The method 200 may be performed by any suitable system, apparatus, or device. For example, the test module 106 of the electronic device 102 of FIG. 1B may perform one or more of the operations associated with the method 200. Although illustrated with discrete blocks and phases, the steps and operations associated with one or more of the blocks of the method 200 may be divided into additional blocks, combined into fewer blocks, or eliminated, depending on the particular implementation. The method 200 may be performed with respect to one or more portions of an event-driven software program that may act as code under test, such as the code under test 104 of FIG. 1A. Additionally, the method 200 may be performed using one or more principles of symbolic execution that are known in the art.

In some embodiments, the method 200 may begin at block 202, at which an opening page of an event-driven software program may be loaded. At block 204, an execution target list may be initialized based on the opening page. In some embodiments, the execution target list may be implemented as an execution target queue in which execution targets included in the execution target queue may be symbolically executed on a "First In First Out" ("FIFO") basis. In the present disclosure reference to "execution targets" may refer to events or specific branches within the event-handler of an event that may be flagged or designated for execution during symbolic execution of the event-driven software program. In some embodiments, one or more of the execution targets may be symbolic states that may be determined during symbolic execution.

A symbolic state may designate either the entry-point or a particular branch within a particular event-handler (corresponding to a particular event), that has been reached during symbolic execution of the event-driven software program and that has been flagged for execution in the future. The designated event may have been discovered through the symbolic execution of a specific sequence of preceding events leading up to it. The symbolic execution of each of the preceding events may correspond to symbolically executing a particular path in the event-handler of that event. A branch may refer to one of the two possible execution directions that may correspond to the "true" or "false" evaluation of a condition statement, such as "if-then-else" statement. In some embodiments, an execution target may designate a particular event of interest, reachable by a specific sequence of preceding events, as indicated by the behavioral model (described further below), that may not as yet have been executed through symbolic execution in the specific manner indicated—e.g., through the particular sequence of preceding events. The particular event may be of interest because its event-handler may not have been adequately explored through previous exploration—e.g., the event-handler may currently have insufficient structural coverage.

By way of example, the loaded opening page may include one or more events. The events on the loaded opening page may be included in the execution target list as execution targets. The events on the opening page may be determined using any suitable technique.

At block 206, an execution target may be selected from the initial execution target list. In some embodiment, the execution target may be randomly selected from the initial execution target list at block 206. In these or other embodiments, the execution target list may include an execution target queue and the execution target at the "top" of the queue may be selected.

At block 208, a selected execution target may be executed. In the present example, the method 200 may proceed from block 206 to block 208 such that the execution target selected at block 206 may be executed at block 208 in response to the method proceeding from block 206 to block 208. In the present disclosure, reference to execution of an execution target may include symbolically executing the events that may be part of the execution target. For example, in some instances, the selected execution target may be a single event such that execution of the execution target may include execution of the single event. In other instances, the selected execution target may include an event sequence leading up to a target event that includes multiple events listed in a particular order. In some of these instances, execution of the selected execution target may include executing the event sequence in the order indicated. Further, in some instances, the selected execution target may include a symbolic state that may be executed. Additionally or alternatively, in some embodiments, the selected execution target may be symbolically executed at block 208.

At block 210, structural coverage information of the event-driven software program may be updated. In some embodiments, the structural coverage information may be updated in response to and based on execution of the selected execution target at block 208. For example, the structural coverage information may indicate which portions of the event-driven software program have been explored or covered as a result of the symbolic execution thus far. These "portions" may refer to lines of source code (line coverage or statement coverage), branch directions of condition statement (branch coverage), or any other suitable measure, such as condition coverage or path coverage. Additionally, execution of the selected execution target may cause the execution of portions of the code of the event-driven software program that had not been previously executed or called. The newly executed portions of the code may thus be added to the structural coverage information to update the structural coverage information. In the present disclosure, reference to "updating" the structural coverage information may include initializing the structural coverage information and creating structural coverage information when none was previously present.

At block 212, a behavioral model of the event-driven software program may be updated. In some embodiments, the behavioral model may be updated in response to and based on execution of the selected execution target at block 208. For example, the behavioral model may include an Extended Labeled Transition System (ELTS) model of the event-driven software program that may indicate which set of traces have been explored. A trace may correspond to the execution of a specific sequence of parameterized events, in which each event is executed with a specific set of parameter values. For example, a parameterized event may include an HTML form on a web-page, with a submit button and the parameters including the values for each of the form-fields that may be "submitted" when the submit button is clicked. When executed, as such, a trace executes specific paths within the event-handler of each event, and produces a particular output web page, as a consequence of the execution. For the purpose of learning the behavioral model, a trace is designated by a sequence of input-output pairs, each input being a specific parameterized event, with specific parameter values, and the output being a representation of the web page produced as a result of this execution, in this context, e.g., by executing this particular sequence of inputs. Additionally, execution of the selected execution target may result in the exploration of additional traces. The newly explored traces may thus be added to behavioral model to update the behavioral model. In the present disclosure, reference to "updating" the behavioral model may include initializing the behavioral model and starting the behavioral model when none was previously present.

The behavioral model may be generated using any suitable technique. For example, in some embodiments, the behavioral model may be generated using a passive learning algorithm such as the BlueFringe passive model learning algorithm. Additionally or alternatively, in some embodiments, the updating of the behavioral model may include annotating the behavioral model with the structural coverage information. In these or other embodiments the behavioral model may be annotated based on states encountered during the symbolic execution and based on events that may be associated with those states.

For example, the states in the behavioral model may correspond to specific states of the event-driven software program (e.g., program states corresponding to accessing specific web-pages) and edges of the behavioral model may correspond to specific events that have been executed. Further, each event may map to a specific event-handler. In addition, as disclosed above, the coverage information of these event-handler functions may be updated with respect to the execution performed so far (e.g., through the traces generated so far). Based on the updated structural coverage information, each event (edge) in the behavioral model may be annotated with the current coverage value of its respective event handler. Further, the events that are available at a particular state but have not been executed yet may also be similarly annotated in the behavioral model. Additionally or alternatively, in some instances, an event-handler may be shared by several events. As such, even if one of those events is not executed, the corresponding event-handler may have been partially or completely covered and annotated accordingly.

Figure 3:
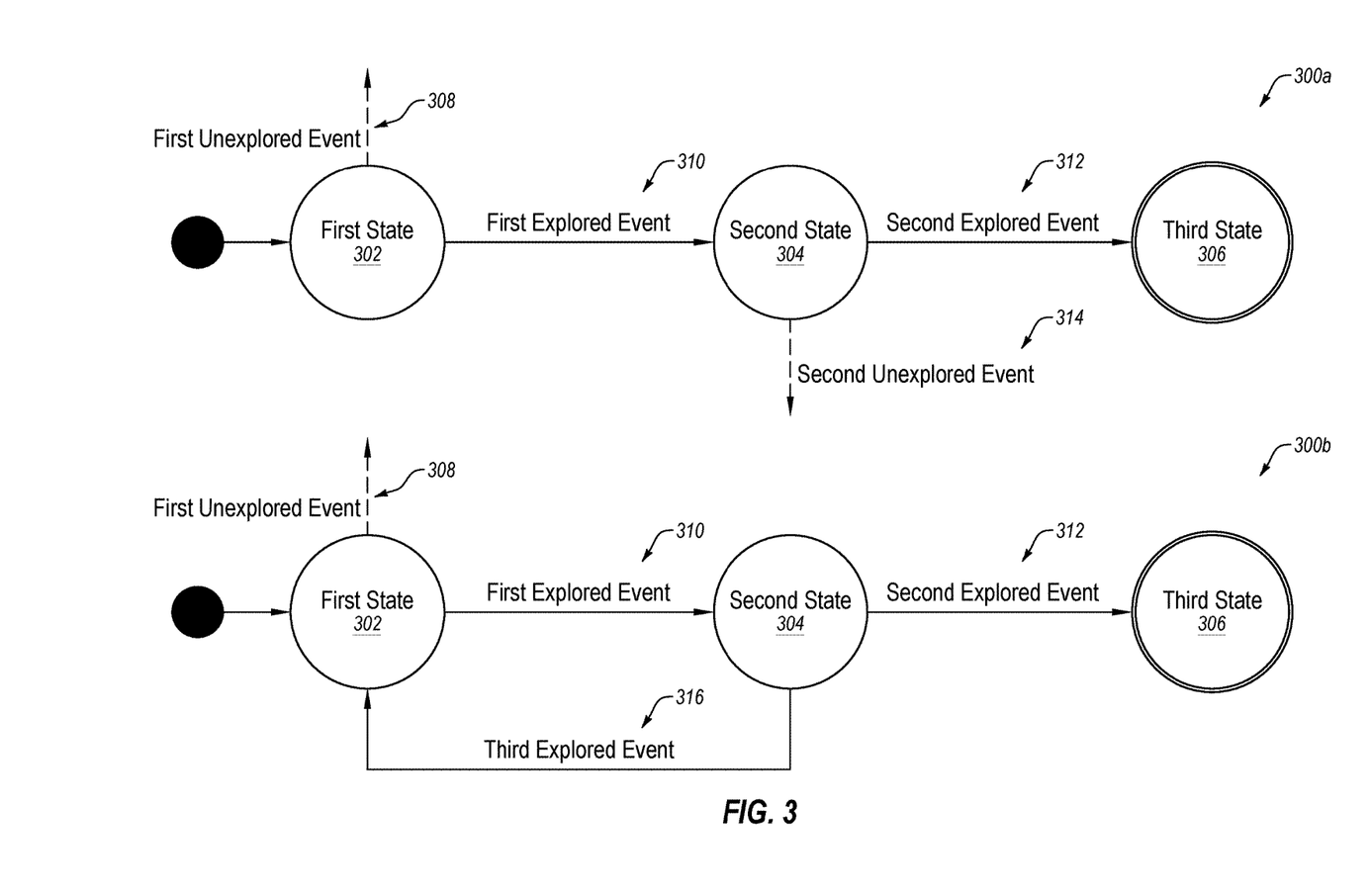
FIG. 3 illustrates an example behavioral model that may be generated during symbolic execution.

For example, FIG. 3 illustrates an example behavioral model that may be generated during the symbolic execution, according to one or more embodiments of the present disclosure. In particular, FIG. 3 illustrates a first version 300a of a behavioral model that may include a first state 302, a second state 304, and third state 306. The first state 302, the second state 304, and the third state 306 may have been added to the behavioral model during the symbolic execution based on the structural coverage information indicating that the first state 302, the second state 304, and the third state 306 being encountered during the symbolic execution. Additionally, the first behavioral model 300a may include a first explored trace 310 and a second explored trace 312, which may indicate first and second events that may have been executed, as indicated by the structural coverage information. Further, the first behavioral model 300a may include a first unexplored trace 308 and a second unexplored trace 314 which may be associated with first and second unexplored events, respectively. The first unexplored trace 308 and the second unexplored trace 314 may be represented differently from the first explored trace 310 and the second explored trace 312 (e.g., with dotted arrows instead of solid arrows) to indicate the differences.

Further, in some embodiments, structural coverage information indicating how much of an event-handler corresponding to an explored event has been explored may be associated with the model. For example, a coverage percentage (e.g., indicated in the structural coverage information) that corresponds to lines, branches, conditions, or paths of event-handlers that correspond to the first explored event and the second explored event may be annotated with respect to the first explored event and the second explored event. In some embodiments, the coverage percentages may be included in a data structure of the behavioral model with respect to the first explored event and the second explored event. Additionally or alternatively, the coverage percentages may be included in a data map that corresponds to the behavioral model.

Additionally, FIG. 3 illustrates a second version 300b of the behavioral model after execution of the second unexplored event with annotations made in response to that execution. In particular, the second unexplored trace 314 may become a third explored trace 316 that corresponds to execution of the second unexplored event, which may now be a third explored event. Additionally, structural coverage information indicating how much of an event-handler that corresponds to the third explored event may be associated with the second version 300b of the behavioral model. For example, coverage percentages of the event-handler that corresponds to the third explored event may be annotated to the behavioral model by being added to its corresponding data structure or data map.

Returning to FIG. 2, at block 214, the execution target list may be updated. For example, the event-driven software program may transition from a first state to a second state in response to execution of the selected execution target. The second state may include execution targets that may be added to the execution target list. Additionally, in some embodiments, updating the execution target list may include determining a prioritization for execution of the execution targets included in the execution target list.

In these or other embodiments, the execution target list may be organized based on the prioritization. For example, in some embodiments the execution target list may be organized as an execution target queue. The execution target queue may be ordered based on the prioritization such that the execution targets may be selected from the queue and executed according to their relative priorities in which higher priority execution targets are selected over lower priority execution targets.

In some embodiments, the prioritization may be based on whether an execution target is associated with an unexplored event-handler, a partially-explored event-handler, or a fully-explored event-handler. For example, execution targets that are associated with partially-explored event-handlers may be prioritized over execution targets that are associated with fully-explored event-handlers and execution targets that are associated with unexplored event-handlers may be prioritized over execution targets that are associated with partially-explored event-handlers.

In the present disclosure, reference to an execution target being associated with an event-handler may indicate that at least a portion of the event-handler is called or executed in response to the execution of the "associated" event. Additionally, reference to an unexplored event-handler may indicate that no portion of the corresponding event-handler has been called or executed during the symbolic execution that is being performed at the time. Further, reference to a partially-explored event-handler may indicate that at least a portion but not all of the corresponding event-handler has been called or executed during the symbolic execution that is currently being performed at the time. Reference to a fully-explored event-handler may indicate that all of the corresponding event-handler has been explored. As indicated above, use of the term "explored" may refer to behavior of the event-driven software program that may be covered as a result of symbolic execution. Further, as indicated above, a determination of the covered behavior may be measured based on a structural coverage metric such as line coverage or branch coverage.

Additionally or alternatively, the prioritization may be based on event sequences that may be associated with the execution targets. For example, in some embodiments, a prioritization between execution targets that are associated with unexplored event-handlers may be based on a number of events in event-sequence paths between an initial state or a current state of the event-driven software program and the corresponding execution targets.

In particular, a first execution target that is associated with a first unexplored event-handler may have a first event-execution path between the first execution target and a current state (or an initial state) of the event-driven software program may include a first number of events. In addition, a second execution target that is associated with a second unexplored event-handler may have a second event-execution path between the second execution target and the current state (or the initial state) of the event-driven software program may include a second number of events. The second number of events in the second event-execution path may be greater than the first number of events in the first event-execution path. The first execution target may be prioritized over the second execution target based on the first number of events in the first event-execution path being less than the second number of events in the second event-execution path. The first unexplored event-handler may be the same as the second unexplored event-handler in some instances. Additionally, the first unexplored event-handler may be different from the second unexplored event-handler in some instances.

As another example, in some embodiments, a prioritization between execution targets that are associated with partially-explored event-handlers may be based on a number of events in event-sequence prefixes of the corresponding execution targets. In particular, a first execution target that is associated with a first partially-explored event-handler may have a first event-sequence prefix. Additionally, a second execution target that is associated with a second partially-explored event-handler may have a second event-sequence prefix that is longer than the first event-sequence prefix. The first execution target may be prioritized over the second execution target in this example based on the first event-execution prefix being shorter than the second event-execution prefix. In the present disclosure, reference to lengths of event-execution paths or prefixes may refer to the number of event that may be included in the event-execution paths or prefixes. Additionally, the first partially-explored event-handler may be the same as the second partially-explored event-handler in some instances or the first partially-explored event-handler may be different from the second partially-explored event-handler in other instances.

In some embodiments, the prioritization may be determined based on the behavioral model. For example, the behavioral model may indicate which of the execution targets are associated with unexplored event-handlers, partially-explored event-handlers, and fully-explored event-handlers, as indicated above. Additionally or alternatively, the behavioral model may indicate event-sequences (e.g., event-sequence prefixes and event-sequence paths) and their corresponding lengths that may be associated with the execution targets. Therefore, in some embodiments, which execution targets are associated with unexplored event-handlers, partially-explored event-handlers, or fully-explored event-handlers may be determined from the behavioral model and its corresponding associations (e.g., annotations of a corresponding data structure or data map). Additionally, event-sequences and their corresponding lengths may also be determined from the behavioral model in some embodiments. The determined associations with event-handlers and event-sequence lengths may be applied to the prioritization described above. As such, the behavioral model may be used to prioritize the execution of the execution targets included in the execution target list.

At block 216 it may be determined whether coverage goals of the exploration are met or whether resource constraints are exceeded. The coverage goals may correspond to structural coverage targets and may include a target amount (e.g., a percentage) of coverage of lines or branches of the event-driven software program. Resource constraints may correspond to how long it may take to explore the event-driven software program or an amount of processing that may be involved in doing so and may include a total runtime, a number of attempts at exploring a partially-explored event-handler, and a maximum event sequence length of the execution targets.

In response to determining that the coverage goals of the exploration are not met or that the resource constraints are not exceeded, the method 200 may proceed from block 216 to block 218. At block 218, an execution target may be selected from the list of execution targets. In some embodiments, the execution target may be selected from the list based on the prioritization described above. For example, the execution target at the "top" of an execution target queue that is organized based on the prioritization may be selected. Additionally, as described above, in some embodiments, the prioritization may be based on the behavioral model such that the selection may be determined based on the behavioral model. The execution target selected at block 218 may be executed at block 208.

Returning to block 216, in response to determining that the coverage goals of the exploration are met or that the resource constraints are exceeded, the method 200 may proceed from block 216 to block 220. At block 220, the event sequences that were explored during the performance of operations with respect to blocks 202, 204, 206, 208, 210, 212, 214, 216, and 218 may be output as test event-sequences.

The method 200 may accordingly be used to determine test event-sequences for an event-driven software program by exploring the event-driven software program using symbolic execution that is directed by a behavioral model. The direction of the symbolic execution by the behavioral model may improve the efficiency of the symbolic execution and reduce the number of redundant paths that may be explored.

Modifications, additions, or omissions may be made to the method 200 without departing from the scope of the present disclosure. For example, the operations described may be implemented in differing order. By way of particular example, the updating of the execution target list may include adding new execution targets to the execution target list and may not include organizing the execution target list according to the prioritization. In these or other embodiments, the prioritization may be determined at the time that the selection is made at block 218. Furthermore, the outlined steps and actions are only provided as examples, and some of the steps and actions may be optional, combined into fewer steps and actions, or expanded into additional steps and actions without detracting from the essence of the disclosed embodiments.

As indicated above, the embodiments described in the present disclosure may include the use of a special purpose or general purpose computer (e.g., the processor 110 of FIG. 1B) including various computer hardware or software modules, as discussed in greater detail below. Further, as indicated above, embodiments described in the present disclosure may be implemented using computer-readable media (e.g., the memory 112 of FIG. 1B) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one," "one or more," "at least one of the following," and "one or more of the following" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    selecting, based on a behavioral model of an event-driven software program, an execution target of the event-driven software program from a plurality of execution targets of the event-driven software program, wherein:
        the behavioral model is generated using passive learning that is based on behavior of the event-driven software program during symbolic execution of the event-driven software program; and the execution target includes an event of the event-driven software program;
    symbolically executing the execution target based on the selection, wherein the event-driven software program transitions from a first state to a second state in response to execution of the execution target; and
    updating the behavioral model of the event-driven software program based on symbolically executing the execution target.

2. The method of claim 1, wherein the behavioral model is annotated with structural coverage information that is generated during the symbolic execution and that indicates which portions of the event-driven software have been covered during the symbolic execution.

3. The method of claim 2, further comprising:
    updating the structural coverage information of the event-driven software program based on symbolically executing the execution target; and
    annotating the behavioral model with the updated structural coverage during updating of the behavioral model.

4. The method of claim 1, further comprising generating a plurality of test event-execution sequences for the event-driven software program based on the symbolic execution of the event-driven software program, wherein the plurality of test event-execution sequences includes the transition from the first state to the second state.

5. The method of claim 1, further comprising:
determining, based on the behavioral model, that the execution target is associated with an unexplored event-handler of the event-driven software program; and
selecting the execution target over other execution targets of the plurality of execution targets based on the execution target being associated with an unexplored event-handler of the event-driven software program and based on the other execution targets each being associated with an at least partially-explored event-handler of the event-driven software program.

6. The method of claim 1, further comprising:
determining, based on the behavioral model, that the execution target is associated with a partially-explored event-handler of the event-driven software program; and
selecting the execution target over other execution targets of the plurality of execution targets based on the execution target being associated with a partially-explored event-handler and based on the other execution targets each being associated with a fully-explored event-handler.

7. The method of claim 1, wherein the selected execution target is a first execution target of the plurality of execution targets and the method further comprises:
determining, based on the behavioral model, that the first execution target is associated with a first unexplored event-handler of the event-driven software program, wherein a first event-execution path between the first execution target and a current state of the event-driven software program includes a first number of events;
determining, based on the behavioral model, that a second execution target of the plurality of execution targets is associated with a second unexplored event-handler of the event-driven software program, wherein a second event-execution path between the second execution target and the current state of the event-driven software program includes a second number of events;
determining, based on the behavioral model, that the first number of events in the first event-execution path is less than the second number of events in the second event-execution path; and
selecting the first execution target over the second execution target based on the first number of events being less than the second number of events.

8. The method of claim 1, wherein the selected execution target is a first execution target of the plurality of execution targets and the method further comprises:
determining, based on the behavioral model, that the first execution target is associated with a first unexplored event-handler of the event-driven software program, wherein a first event-execution path between the first execution target and an initial state of the event-driven software program includes a first number of events;
determining, based on the behavioral model, that a second execution target of the plurality of execution targets is associated with a second unexplored event-handler of the event-driven software program, wherein a second event-execution path between the second execution target and the initial state of the event-driven software program includes a second number of events;
determining, based on the behavioral model, that the first number of events in the first event-execution path is less than the second number of events in the second event-execution path; and
selecting the first execution target over the second execution target based on the first number of events being less than the second number of events.

9. The method of claim 1, wherein the selected execution target is a first execution target of the plurality of execution targets and the method further comprises:
determining, based on the behavioral model, that the first execution target is associated with a partially-explored event-handler of the event-driven software program;
determining, based on the behavioral model, that a second execution target of the plurality of execution targets is associated with the partially-explored event-handler;
determining, based on the behavioral model, that the first execution target has a shorter event-sequence prefix than that of the second execution target; and
selecting the first execution target over the second execution target based on the first execution target having a shorter event-sequence prefix than that of the second execution target.

10. The method of claim 1, wherein at least one non-transitory computer readable media is configured to store one or more instructions that, in response to being executed by at least one processor, cause a system to perform the method of claim 1.

11. A method comprising:
generating, using passive learning, a behavioral model of an event-driven software program based on behavior of the event-driven software program that is in response to symbolic execution of one or more events of the event-driven software program;
prioritizing, based on the behavioral model, symbolic execution of execution targets included in a list of execution targets, wherein each execution target included in the list of execution targets includes an event of the event-driven software program;
exploring the event-driven software program based on the prioritization of execution of the execution targets; and
generating a plurality of test event-execution sequences for the event-driven software program based on exploration of the event-driven software program.

12. The method of claim 11, wherein the behavioral model is annotated with structural coverage information that is generated during the symbolic execution and that indicates which portions of the event-driven software have been covered during the symbolic execution.

13. The method of claim 12, further comprising:
updating the structural coverage information of the event-driven software program based on symbolically executing the execution target; and
annotating the behavioral model with the updated structural coverage during updating of the behavioral model.

14. The method of claim 11, wherein prioritizing execution of the execution targets includes prioritizing the execution of execution targets that are associated with unexplored event-handlers over the execution of execution targets that are associated with at least partially-explored event-handlers.

15. The method of claim 11, wherein prioritizing execution of the execution targets includes prioritizing the execution of execution targets that are associated with partially-explored event-handlers over the execution of execution targets that are associated with fully-explored event-handlers.

16. The method of claim 11, wherein prioritizing execution of the execution targets includes prioritizing the execution of execution targets that are associated with unexplored event-handlers based on a number of events in event-sequence paths between a current state of the event-driven software program and the execution targets that are associated with unexplored event-handlers.

17. The method of claim 11, wherein prioritizing execution of the execution targets includes prioritizing the execution of execution targets that are associated with unexplored event-handlers based on a number of events in event-sequence paths between an initial state of the event-driven software program and the execution targets that are associated with unexplored event-handlers.

18. The method of claim 11, wherein prioritizing execution of the execution targets includes prioritizing the execution of execution targets that are associated with partially-explored event-handlers based on lengths of event-sequence prefixes of the execution targets that are associated with partially-explored event-handlers.

19. The method of claim 11, wherein at least one non-transitory computer readable media is configured to store one or more instructions that, in response to being executed by at least one processor, cause a system to perform the method of claim 11.

20. A system comprising:
at least one processor; and
at least one non-transitory computer-readable media communicatively coupled to the one or more processors and configured to store instructions that, in response to being executed by the at least one processor, cause the system to perform operations, the operations comprising:
selecting, based on a behavioral model of an event-driven software program, an execution target of the event-driven software program from a plurality of execution targets of the event-driven software program, wherein: the behavioral model is generated using passive learning that is based on behavior of the event-driven software program during symbolic execution of the event-driven software program; and the execution target includes an event of the event-driven software program;
symbolically executing the execution target based on the selection, wherein the event-driven software program transitions from a first state to a second state in response to execution of the execution target; and
updating the behavioral model of the event-driven software program based on symbolically executing the execution target.

\* \* \* \* \*